United States Patent [19]

Scherer

[11] Patent Number: 4,541,855

[45] Date of Patent: Sep. 17, 1985

[54] METHOD OF FORMING A GLASS OR CERAMIC PRODUCT

[75] Inventor: George W. Scherer, Big Flats, N.Y.

[73] Assignee: Corning Glass Works, Corning, N.Y.

[21] Appl. No.: 524,372

[22] Filed: Aug. 18, 1983

[51] Int. Cl.[4] .................. C03B 19/02; C03B 19/06
[52] U.S. Cl. ................................. 65/18.1; 65/17; 264/56
[58] Field of Search .............. 65/17, 18.1, 18.2; 501/12; 264/60, 56

[56] References Cited

U.S. PATENT DOCUMENTS

| | | | |
|---|---|---|---|
| 2,268,589 | 1/1942 | Heany | 264/56 |
| 4,042,361 | 8/1977 | Bihuniak et al. | 65/18.2 |
| 4,076,542 | 2/1978 | Deeg et al. | 501/12 X |
| 4,200,445 | 4/1980 | Bihuniak et al. | 65/18.2 |
| 4,260,406 | 4/1981 | Corbett | 65/43 |

FOREIGN PATENT DOCUMENTS 84438 7/1983 European Pat. Off.

*Primary Examiner*—Kenneth M. Schor
*Attorney, Agent, or Firm*—K. van der Steere

[57] ABSTRACT

A method of forming a glass or ceramic product by the direct casting of a non-aqueous suspension of a particulate oxide such as fumed $SiO_2$ or $Al_2O_3$ into a final product configuration, wherein a non-aqueous oxide suspension of limited stability against gelation is cast into shape, permitted to gel, and then dried to provide an integral monolith which can be sintered or otherwise processed to a clear glass or non-porous ceramic product, is described.

3 Claims, No Drawings

METHOD OF FORMING A GLASS OR CERAMIC PRODUCT

BACKGROUND OF THE INVENTION

The present invention relates to the manufacture of glass or ceramic products from particulate oxides, and particularly to an improved method of making such products by the direct casting of non-aqueous suspensions.

It has been recognized that very pure glass and ceramic products can be made using pure fumed oxide starting materials. For example pure fused silica glasses have been used to make glass optical waveguide fibers which exhibit extremely high transparency.

A well known method for producing massive articles from pure fumed oxides is to deposit the oxide particles immediately after they are formed (e.g., in a flame) on a substrate or preform where they adhere to form a porous monolith. This porous body can then be sintered to clear glass and, if necessary, further shaped to a limited degree to provide a product of a desired shape.

There are some shapes which cannot conveniently be formed by the direct deposition of the oxides onto a preform. Accordingly, efforts have been made to develop other ways to process these oxides. However, fumed oxides are generally fluffy, high-surface-area materials (surface areas typically range from 25–400 $m^2$/gram, with average particle sizes typically in the range from 0.01–0.5 microns), and they are very difficult to process by slip-casting or other methods conventionally used for shaping ceramic starting materials.

U.S. Pat. Nos. 4,042,361 and 4,200,445 disclose one approach to the problem which involves dispersing the fumed oxides in water to form a suspension. This suspension is then processed by casting into thin sheets, drying to cause fragmentation or dicing into porous granules, sintering the porous granules to form a densified granular material, milling the densified material to form a casting slip, and finally casting the slip to form a green ceramic shape which can be fired to provide a glass product.

The process disclosed in the above two patents disadvantageously requires the handling of aqueous suspensions of fumed oxides which do not exhibit long shelf life and are relatively viscous even at moderate oxide concentrations. In addition, massive articles are not readily cast directly from aqueous suspensions, due to cracking problems. Thus, according to the above patents, a relatively large number of process steps are required before the final cast shape is obtained.

It has recently been proposed, in my co-pending, commonly assigned patent application Ser. No. 492,890, filed May 9, 1983 and expressly incorporated herein by reference, to use non-aqueous dispersions of particulate oxidic materials such as fumed oxides to form glass articles by direct casting into final shape. In this process the cast shape is formed not by slip casting but by gelation of the suspension in its final configuration, followed by removal of the vehicle and sintering of the resulting porous monolith. This method avoids the intermediate dicing and calcining steps required with water suspensions, and the non-aqueous oxide suspensions used are generally stable and easy to cast.

In the process of the above-described patent application the suspensions are generally stable against gelation and accordingly added gelling agents are used to cause rapid conversion of the fluid suspension to a semi-rigid gelled shape. However, there are some applications for which such rapid gelation is not required, and wherein gelling intervals on the order of 24–28 hours would be adequate. Further, applications exist wherein the use of added gelling agents would be an unnecessary or even an undesirable expedient, from either a processing or chemical composition standpoint.

SUMMARY OF THE INVENTION

In accordance with the present invention the use of a gelling agent is avoided by preparing a non-aqueous suspension of particulate oxidic material which is of only limited stability. In accordance with prior practice, the general process steps are to prepare a fluid suspension of the oxide in a non-aqueous vehicle, cast the suspension to the final product configuration, permit the suspension to gel in that configuration, and remove the vehicle from the gelled casting to provide a porous monolith. Generally, no change in cast configuration except for shrinkage due to drying will occur.

In accordance with the present invention, however, rather than preparing a fully stable suspension which requires an added gelling agent to promote gelation, a suspension is prepared which contains an amount of an added dispersant effective only to obtain a suspension of limited stability. The amount used is sufficient to permit effective dispersion of the oxide in the non-aqueous vehicle, but ineffective to delay gelation of the suspension for a period longer than about 48 hours from the time of dispersion. A suspension prepared in this way is fluid and can be cast into any desired shape within a useful interval after dispersion. However, it will automatically gel within a period of hours after casting so that the vehicle can be efficiently removed from the gelled shape, without cracking of the casting, prior to sintering or other processing of the cast shape.

DETAILED DESCRIPTION

Particulate oxidic materials amenable to processing in accordance with the invention include any of the fumed oxides produced by the known flame oxidation or flame hydrolysis processes, including $SiO_2$, $Al_2O_3$, $TiO_2$, $ZrO_2$, $SnO_2$, $P_2O_5$, $GeO_2$, $B_2O_3$ and the like. These processes produce oxide particle sizes below 1 micron and typically in the range of about 0.01–0.5 microns which are quite suitable for handling in accordance with the invention. In addition to pure fumed oxides and mixtures of these oxides it is possible to use oxidic materials of appropriate particle size produced by other processes, as well as multicomponent oxide materials produced by the flame oxidation of mixtures of precursor materials. These include $SiO_2$-$B_2O_3$, $SiO_2$-$GeO_2$, $SiO_2$-$P_2O_5$ and similar compositions which may produce amorphous (non-crystalline or glassy) fumed oxide particles, also known as soot, upon flame oxidation. Hence crystalline or non-crystalline oxide materials produced by any suitable process can be used.

It is desirable prior to incorporation of a fumed or other oxide into the vehicle to dry the oxide to remove adsorbed water from the particles. The presence of water can cause undesirable gelling of these suspensions. Typically, heating the oxide material above about 100° C. in air or other dry environment for a short interval prior to use is sufficient.

Non-aqueous vehicles which can be used in accordance with the invention include n-hexane, chloroform, methylene chloride, methanol, ethanol, and other lowmolecular weight unsubstituted or OH- or halogen-substituted hydrocarbons of like character. Water is not a suitable vehicle because it is not a medium in which fumed oxides are easily dispersed, and because castings containing a water vehicle are prone to cracking during the vehicle removal or drying stage of the process. Other vehicles such as 1-propanol may not be suitable if they provide a stable suspension of fumed oxides without the use of a dispersant, because such a suspension will not gel after casting. Hence vehicles which require the use of a dispersant to achieve a flowable suspension which resists gelation to at least some degree should be used.

Dispersants suitable for use in accordance with the invention to achieve suspensions of limited stability include those effective to disperse inorganic materials in organic media by steric hindrance, electrical double layer, and/or polar screening mechanisms. The use of a steric hindrance mechanism, involving the use of a chain-like molecule comprising both hydrophilic and hydrophobic groups compatible respectively with the hydrophilic oxide and non-aqueous vehicle constituents of the system, is advantageous because relatively concentrated dispersions can be formed by this method. Examples of dispersants effective to promote dispersion by steric hindrance include stearic acid, stearic alcohol, and the straight-chain lower alcohols containing 3–10 carbon atoms, e.g., n-propanol.

The technique of forming the dispersion is not critical, and the amount of dispersant effective to obtain limited stability in any particular suspension can readily be determined by routine experiment. A suitable approach is to prepare a series of vehicle mixtures containing a selected vehicle and a range of added dispersant concentrations, combine the vehicle mixtures with selected quantities of the selected oxide material to be processed, and then to determine gelling time as a function of dispersant concentration in the series under evaluation.

The invention may be further understood by reference to the following illustrative Example.

EXAMPLE

A vehicle mixture for an oxide suspension is prepared which consists of about 150 ml. of methanol as the vehicle component and 2.2 ml. of 1-propanol as the dispersant. To this vehicle is added a fumed oxide component consisting of 60 grams of fumed $SiO_2$ produced by flame oxidation. This oxide had been fired to 800° C. in $N_2$ to remove adsorbed gases and reduce the number of silanol groups. Prior to incorporation in the suspension, it is dried at 200° C. for 1 hour in a vacuum to remove adsorbed water picked up in storage.

The fumed oxide is dispersed in the vehicle mixture by ball-milling the two together for about 16 hours. This suspension is then cast into a rectangular mold about 5 cm.×7.6 cm. in size to a depth of about 2.5 cm, and the casting is covered with polyethylene film to prevent vehicle loss prior to gelation.

Gelation of the casting thus provided occurs within about 24 hours, after which the plastic covering film is vented to permit evaporation of the vehicle and dispersant. The casting can be completely dried, with some shrinkage but without cracking, in about 3 weeks, after which it can be fired to produce an optically clear glass slab about 3.8×4.5×0.8 cm. in size.

While the preceding example is based on the use of a methanol vehicle and a 1-propanol dispersant, 1-decanol can also be successfully used as a dispersant in this vehicle. A further example of a desirable vehicle/dispersant system is a chloroform vehicle containing a 1-propanol dispersant.

It is anticipated that any of the other non-aqueous vehicles hereinabove described can be used with any of the described dispersants to produce a non-aqueous fumed oxide suspension suitable for use in the invention, provided only that the amount of dispersant employed is limited to that effective to permit dispersion without full stabilization of the dispersion against gelation.

I claim:

1. In a method of forming a glass or ceramic product by the direct casting of a particulate fumed or other submicron oxide suspension, wherein a fluid suspension of the particulate fumed or other submicron oxide in a non-aqueous vehicle is prepared, the vehicle consisting of a substituted or unsubstituted hydrocarbon fluid for suspending said oxide, the suspension is cast into a final configuration for the product, gelled in that configuration, dried with no change in configuration except for shrinkage, and finally fired to provide the glass or ceramic product, the improvement comprising:
   (i) including of at least one dispersant in the suspension, said dispersant consisting of an agent effective to disperse inorganic material in an organic medium by steric hindrance, electrical double layer formation or polar screening;
   (ii) maintaining the suspension free of any gelling agents, and employing, as the vehicle for the suspension, a vehicle which does not add stability to the suspension; and
   (iii) adding the dispersant to the suspension in an amount at least sufficient to provide effective dispersion of the particulate fumed or other submicron oxide in the vehicle to permit the suspension to be cast into a final configuration but insufficient to delay gellation of the suspension for a period longer than about 48 hours.

2. A method in accordance with claim 1 wherein the vehicle is an unsubstituted or halogen- or hydroxyl-substituted hydrocarbon fluid selected from the group consisting of hexane, chloroform, methylene chloride, methanol, and ethanol.

3. A method in accordance with claim 2 wherein the dispersant is selected from the group consisting of stearic acid, stearic alcohol, and straight-chain alcohols containing 3–10 carbon atoms.

* * * * *